US009390303B2

(12) United States Patent
Sandler et al.

(10) Patent No.: US 9,390,303 B2
(45) Date of Patent: Jul. 12, 2016

(54) SYNCHRONIZATION OF RADIO FREQUENCY IDENTIFICATION READERS USING INFRARED PULSE (71) Applicant: SYMBOL TECHNOLOGIES, INC., Schaumburg, IL (US)

(72) Inventors: Robert I. Sandler, Melville, NY (US); David E. Bellows, Wantagh, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/461,462

(22) Filed: Aug. 18, 2014

(65) Prior Publication Data

US 2016/0048708 A1  Feb. 18, 2016

(51) Int. Cl.
G06K 7/10       (2006.01)
G06K 7/016      (2006.01)

(52) U.S. Cl.
CPC ............ *G06K 7/10475* (2013.01); *G06K 7/016* (2013.01)

(58) Field of Classification Search
None
See application file for complete search history.

(56) References Cited

U.S. PATENT DOCUMENTS

| 7,817,014 | B2 | 10/2010 | Krishna et al. | |
| 8,125,339 | B2 | 2/2012 | Neuwirth | |
| 8,733,630 | B2 | 5/2014 | Frerking | |
| 2006/0076401 | A1* | 4/2006 | Frerking | G06K 7/0008 235/380 |
| 2007/0001813 | A1 | 1/2007 | Maguire et al. | |
| 2007/0057057 | A1* | 3/2007 | Andresky | G06K 7/0008 235/451 |
| 2007/0080788 | A1 | 4/2007 | Manley et al. | |
| 2010/0207736 | A1 | 8/2010 | Park et al. | |
| 2011/0210828 | A1* | 9/2011 | Sun | G06K 7/0008 340/10.2 |
| 2012/0138691 | A1* | 6/2012 | Bosquet | G06K 19/077 235/492 |

* cited by examiner

*Primary Examiner* — Daniell L Negron
(74) *Attorney, Agent, or Firm* — Nong-Qiang Fan (57) ABSTRACT A system and method system for synchronizing Radio Frequency Identification (RFID) readers includes a plurality of RFID readers disposed within an environment. Each RFID reader includes an infrared emitter and an infrared detector. A master controller also includes a master infrared emitter and is operable to emit a master infrared flash from the master infrared emitter for synchronizing the plurality of RFID readers. Any of the RFID readers, upon detecting an infrared flash with their associated infrared detector, is operable to synchronize their dwell timing with the detected infrared flash and emit their own infrared flash from their associated infrared emitter, so as to propagate infrared flashes to all the RFID readers within the environment.

14 Claims, 7 Drawing Sheets

SYNCHRONIZATION OF RADIO FREQUENCY IDENTIFICATION READERS USING INFRARED PULSE

BACKGROUND

Radio Frequency Identification (RFID) is utilized in a variety of applications with RFID readers interrogating RFID tags for purposes of identification, location, tracking, and the like. However, a single RFID reader in a large room will not be able to read all the RFID tags at opposite ends of the room. Therefore, in an exemplary RFID application, a plurality of RFID readers are mounted overhead (e.g., ceiling mounted) in a grid array to be able to read all the RFID tags, such as in a retail environment, a factory environment, a warehouse environment, etc. However, having multiple RFID readers in close proximity has disadvantages.

For example, interference can be experienced between RFID readers which have active antennas aligned with each other. This interference can cause both readers to not see tags of interest, which are important for tracking inventory accurately. In addition, if the RFID readers are allowed to run un-synchronized, the antennas of nearby readers may align and interfere with each other causing a reduction of tag reads. This would compromise the accuracy of the system as tags of interest may not be seen at the moment of availability. This same issue is also a problem for channel frequency across the operating band. In the United States, the RFID operating band has fifty channels, while in the European Union there are only four channels. Testing with four channels identified that when two nearby readers try to read one tag on the same frequency or even adjacent frequencies the tag could not be read. Therefore, it is equally important to manage channel frequencies, antenna alignment, and synchronization.

Accordingly, there is a need for an RFID system and method that overcome the aforementioned limitations.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a Radio Frequency Identification (RFID) antenna system and method that manages channel frequencies, and antenna selection, without the need for RF signaling between RFID readers. The present invention also provides an overhead system in a small and lightweight arrangement, where the physical size of the reader is kept to a minimum so that the system is unobtrusive, easy to install, integrate, synchronize, and maintain, and can allow for other features, such as a video camera, access point electronics, etc.

Figure 1:
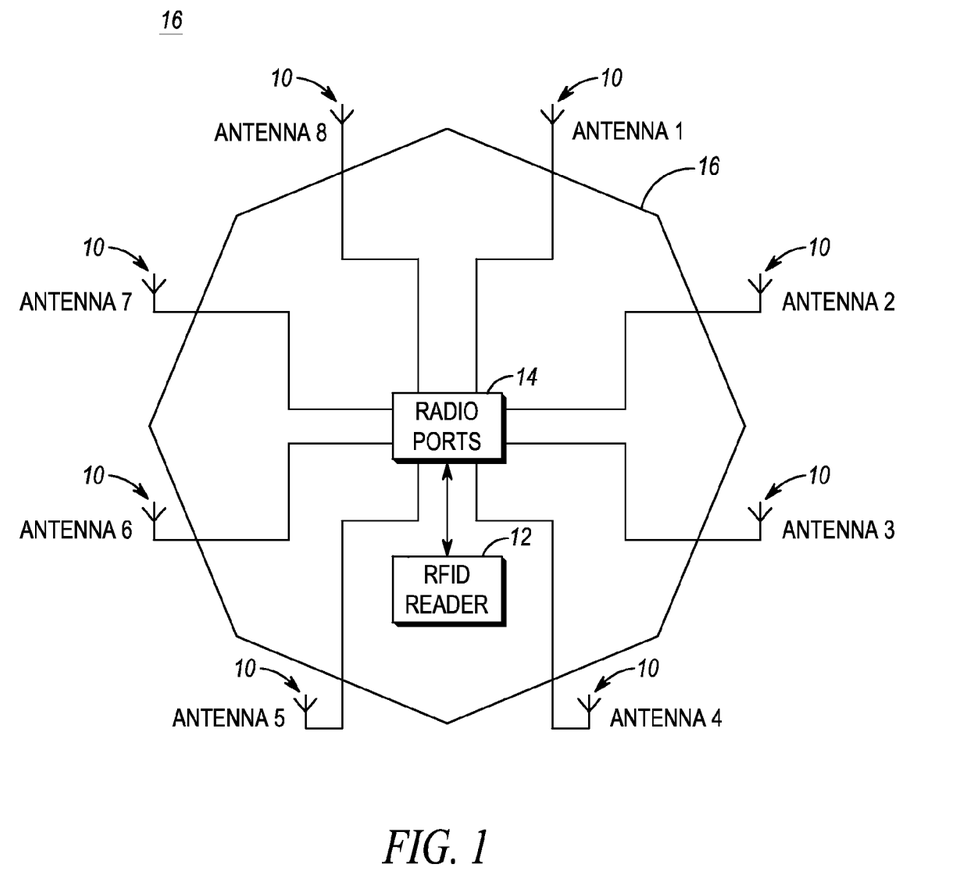
FIG. 1 is a simplified block diagram of an RFID reader and antenna arrangement, in accordance with some embodiments of the present invention.

FIG. 1 illustrates a block diagram of a portion of RFID reader electronics in an RFID reader assembly 16, in accordance with some embodiments of the present invention. It is envisioned that fixed RFID readers are mounted on a ceiling using a forty-foot grid spacing throughout the enterprise, such as a retail store. Each reader has an array of eight antennas 10 arranged in a circular pattern around the reader and positioned outside of a housing encompassing the RFID reader. The RFID reader 12 is communicatively coupled to the antenna elements 10 by providing an RF feed thereto via the radio ports 14. Only one antenna on the reader is active at a time. The active antenna will read tags until its specified dwell time is reached, after which the next antenna in the array will be selected to read RFID tags. The antennas can be switched between different operating frequencies, also.

The RFID reader can be integrated with an access point (not shown) and can direct the different radio ports to sequentially communicatively connect only one antenna element at a time to the RFID reader such that only one antenna element is operable to transmit/receive at any instant in time. The RFID reader can provide any information it obtains from an RFID tag to an access point (not shown) that can be wired or RF wirelessly connected to a local area network (not shown) for inventory purposes, for example. Although eight antenna elements are shown, there could be any number of elements. Preferably, there is an even number of antenna elements arranged in a circle to radiate outwardly from the circle. As shown in this embodiment, there are eight antenna elements evenly disposed at 45 degree intervals of the circle and connected to an eight-port radio.

The housing 20 of the RFID reader can further include electronics and RF components for operation of the antenna arrangement. For example, the electronics and components may include electrical connectivity to the antenna feeds for transmission and reception of radio frequency signals. The housing may further include electronics and the like for operation of the RFID reader as well as other components as described herein.

Figure 2:
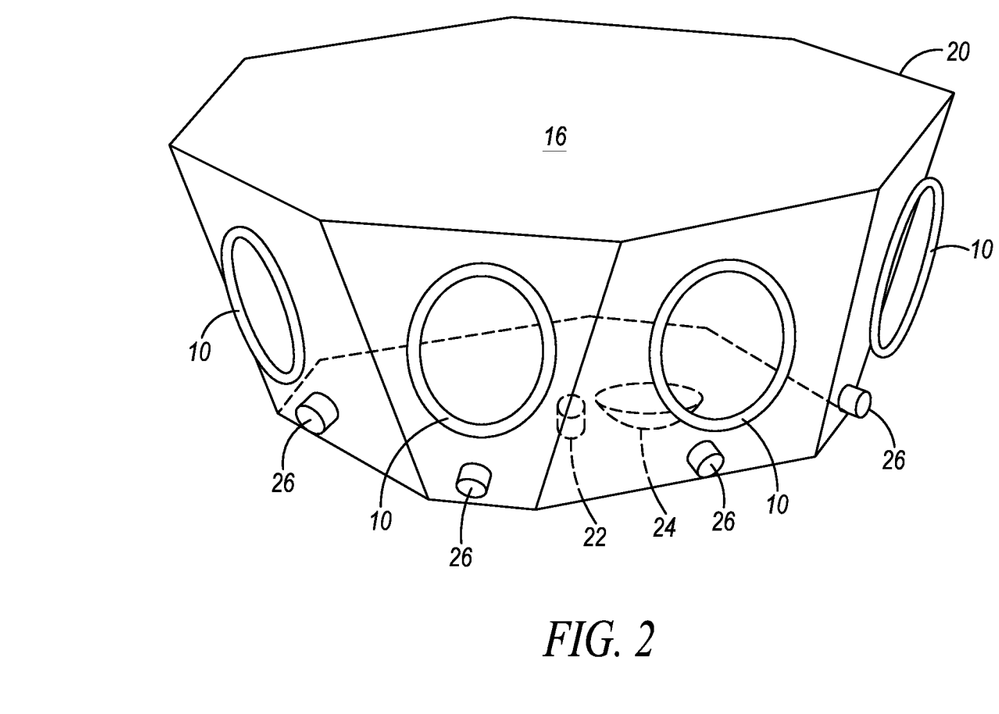
FIG. 2 is a perspective view of the RFID reader assembly, in accordance with some embodiments of the present invention.

Referring to FIG. 2, the housing is defined by joined reflector panels behind all the antenna elements 10, including top and bottom surfaces, to form a substantially continuous grounded housing 20 which the antenna elements use as a reflector. The electronics, components, etc. may be disposed or located behind the reflector panels within the housing. The housing may further include an access point coupled to or integrated with the RFID reader. The RFID reader including the antenna apparatus is configured to operate in an overhead configuration with respect to a plurality of RFID tags. The multiple antenna elements are configured to provide a radiation pattern covering the floor of the environment in proximity to the reader.

In one embodiment, each antenna element includes a linearly polarized, full wavelength loop as the driven element that is oriented above the conductive reflector housing 20, wherein the loop element is fed by an RF signal at a specific point. The loop elements may be horizontally or vertically polarized. In particular, half of the antenna elements have the horizontal polarization and half have the vertical polarization, alternating around the housing. The feed point (not shown) of the horizontal polarization is located ninety degrees from the feed point of the vertical polarization. It should be recognized that there can be embodiments without the continuous housing. Those skilled in the art will recognize that in addition, the loop geometry of each antenna element can be different than what is shown in the exemplary embodiment—as examples, the size can be larger or smaller, the shape does not have to be a circle, the width of the loop does not need to be constant, etc. Variations of the housing are also acceptable, including but not limited to changes in shape, size, etc. Furthermore, the geometric details of the loop and reflector do not necessarily have to be the same for both antenna polarizations.

Each loop element and housing are spaced from each other using insulating spacers or standoffs (not shown) as are known in the art. It should also be recognized that completely different antenna element configurations can be used successfully in the present invention, other than the embodiment shown, to provide a substantially linear polarization, including, but not limited to, a partial loop antenna, a Yagi antenna, a slot antenna, a dipole antenna, a monopole antenna, and the like. It should be recognized that a Yagi antenna, a slot antenna, a dipole antenna, a monopole antenna, and the like can be modified in size and shape while still electrically behaving as a respective Yagi antenna, slot antenna, dipole antenna, a monopole antenna, and the like tuned to the proper RFID frequency band.

FIG. 2 shows a perspective view of an eight antenna element RFID assembly 16 of the present invention from FIG. 1 (with only the front four antenna elements shown to simply the drawing). All the reflector panels behind each antenna element are joined together to create a central metal box or housing 20 that is a trapezoidal pyramidal section with planar surfaces, and that acts as one common reflector for all the antenna elements 10 as well as an electrical ground for the other system contents located inside the box. The central housing 20 can alternatively be a continuous conical surface, as opposed to the faceted embodiment shown in FIG. 2. The configuration shown results in an overall maximum dimension of about 19 inches wide and about 7 inches tall with the housing portion having a maximum dimension of about 15 inches wide.

The RFID reader assembly includes a light emitter 22 (or optionally 26) and a light detector 24. In one embodiment, the light emitter 22 is an infrared light emitting diode and the light detector 24 is an infrared light detector, such as an infrared-sensitive video camera, for example. Optionally, the RFID reader assembly can include a visible or infrared detectable light emitting diode (LED) 26 that is collocated and associated with each antenna element 10, i.e. the LED is placed in front of or adjacent to each of the eight RFID antennas, so that when energy is transmitted from each antenna, its LED lights up, confirming that antenna's operation. If the antenna transmittals are sequenced in a round-robin configuration, then the LEDs will turn on and off in the same sequence, around and around in a circle. This provides a visual confirmation for how the system is operating and where the RF energy is directed from each unit at any instant in time. In this case, the light emitter is the detectable light emitting diode 26 and the light detector 24 is an existing video camera, for example. The detectable LEDs 26 can be powered by RFID energy emitted by their associated antenna element 10, such that when the antenna element is active, its corresponding detectable LED 26 is turned on.

Each RFID reader not only operates using eight antenna elements, but also has several different operating frequencies it can use. For example, in the United States, the RFID operating band has fifty channels, while in the European Union there are four channels. Therefore, in order to perform every possible RFID tag interrogation, an RFID reader must switch between many types of interrogation signals. Accordingly, each RFID reader is configured with a predetermined starting antenna index and frequency index. Each reader can be configured to start with the same or different starting antennas. Once the readers turn on they will run through their antenna tables sequentially and change in lock step with the other readers. All the readers can share the same antenna tables, or each reader can use a different antenna table, but in either case all the readers are to switch antennas at the same time. Also, all the readers must have the same frequency table, but each reader can start at a different frequency index.

Each RFID reader will also have the same antenna and frequency dwell time pre-configured. The dwell time is the time that a reader stays on a particular frequency or antenna. When the system is turned on all readers will start reading based on their starting antenna and frequency index for the pre-configured dwell time. The antennas can be switched after every dwell time (which is not regulated and can be as long as an administrator defines it), but the frequency must change after 400 milliseconds, which is configurable from 0 to 400 milliseconds. However, each reader will have different clock timings due to drift, which necessitates synchronization of dwell events between readers. The present invention serves to provide this synchronization of dwell events, as will be described herein.

Figure 3:
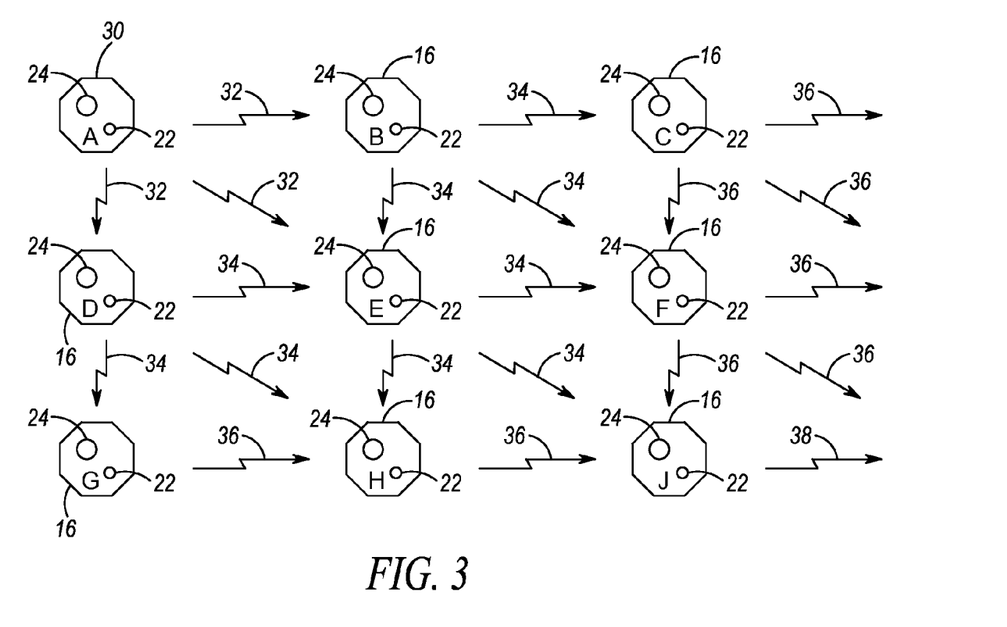
FIG. 3 is a bottom view of a ceiling with mounted RFID readers being synchronized, in accordance with some embodiments of the present invention.

The present invention provides for the synchronizing of a plurality of Radio Frequency Identification (RFID) readers disposed within an environment, as represented in FIG. 3, which shows a bottom view of the plurality of readers disposed on a ceiling of an enterprise environment, such as a retail store. In operation, an RFID reader with an integrated or tethered photo transceiver can synchronize nearby readers throughout an enterprise. A designated master reader will turn on a light transmitter to emit a light flash which can be detected by nearby readers who will then turn on their transmitter until the entire enterprise has been completed covered with light flashes. This will all happen at the speed of light. After receiving a light flash, each RFID reader, on the next millisecond tick of their internal clock, will switch to their next indexed frequency in the frequency index table (and possibly move to the next antenna in the antenna index table) and start their next dwell time for interrogation, thereby synchronizing the dwell event for all the readers. Inasmuch as light can cover 144 meters (which is the size of a very large building) in 500 nanoseconds, the relay of light signals still leaves plenty of time for each reader to start on its next millisecond timer.

In FIG. 3, one of the readers (A) acts as a master controller 30, where the light emitter 22 of that reader serves as a master light emitter, that is operable to emit a master light flash 32 from the master light emitter 22 for synchronizing the plurality of RFID readers 16. The master light flash 32 is emitted before the end of each interrogation dwell time, and is simply a flash of light that is unmodulated and uncoded and carries no information in itself. The master light flash 32 can come from the dedicated light emitter 22 or from any detectable (e.g. visible or infrared) LED (26 from FIG. 2) that is coupled to an associated antenna element, wherein when an antenna element is active, its corresponding detectable LED is turned on.

Any of the RFID readers, upon detecting a light flash 32 (or 34, 36, 38) with their associated light detector 24, is operable to synchronize their dwell timing with the detected light flash and emit their own light flash (34, 36, 38) from their associated light emitter 22, so as to propagate light flashes to all the RFID readers 16 within the environment. In particular, one millisecond before the dwell time expires the master controller 30 will emit its master light flash 32 which will be detected by all its nearby readers, who will then emit another light flash (34, 36, 38) to other RFID readers until all the readers (B-J) in the system have detected a flash. When each reader detects a flash it will generate an internal interrupt in the reader to set an antenna and frequency index change at the next millisecond timer tick. Each RFID reader uses only the first received light flash for synchronization and ignores subsequent light flashes during a dwell period. Since all reader-to-reader signaling will occur at the speed of light this should enable all readers to react at the same time without delay or impact of timer drift.

For example, in FIG. 3, reader A 30 broadcasts a master infrared flash 32 in all directions (even though the figure only shows a limited dispersal), before the end of an dwell period. This master flash 32 is detected by the detectors 24 of nearby readers B, D, E, which triggers a hardware interrupt. Readers B, D, E synchronize their next millisecond tick with the start of a new dwell period, while at the same time readers B, D, E relay the master flash as another, secondary flash emitted from their respective emitters 22 in all directions (even though the figure only shows a limited dispersal) to other readers. In this case, these other readers can be C, F, G, H that relay the secondary flash as a further, tertiary flash emitted from their respective emitters 22 in all directions (even though the figure only shows a limited dispersal) to other readers. However, let us assume that reader J does not directly detect the secondary flash from reader E. Reader J can still receive the tertiary flash from reader F or H, for example. Alternatively, it may be that reader J receives the master flash 32 directly from reader A. In this case, it will ignore all other flashes from other readers during the present dwell period. In either case, the flash is propagated to all readers in the environment, and since the propagation takes less than a millisecond, all the readers will synchronize there next dwell event to the same, next millisecond tick of their clocks.

In any of the above scenarios, upon receiving a light flash, each RFID reader is operable to sequence though the index of operating frequencies, and sequentially communicatively connect to the next antenna element in the antenna index for interrogating RFID tags, where each index sequence is synchronized by the light flash received by the light detector of the RFID reader to the next millisecond clock tick of the RFID reader.

Figure 4:
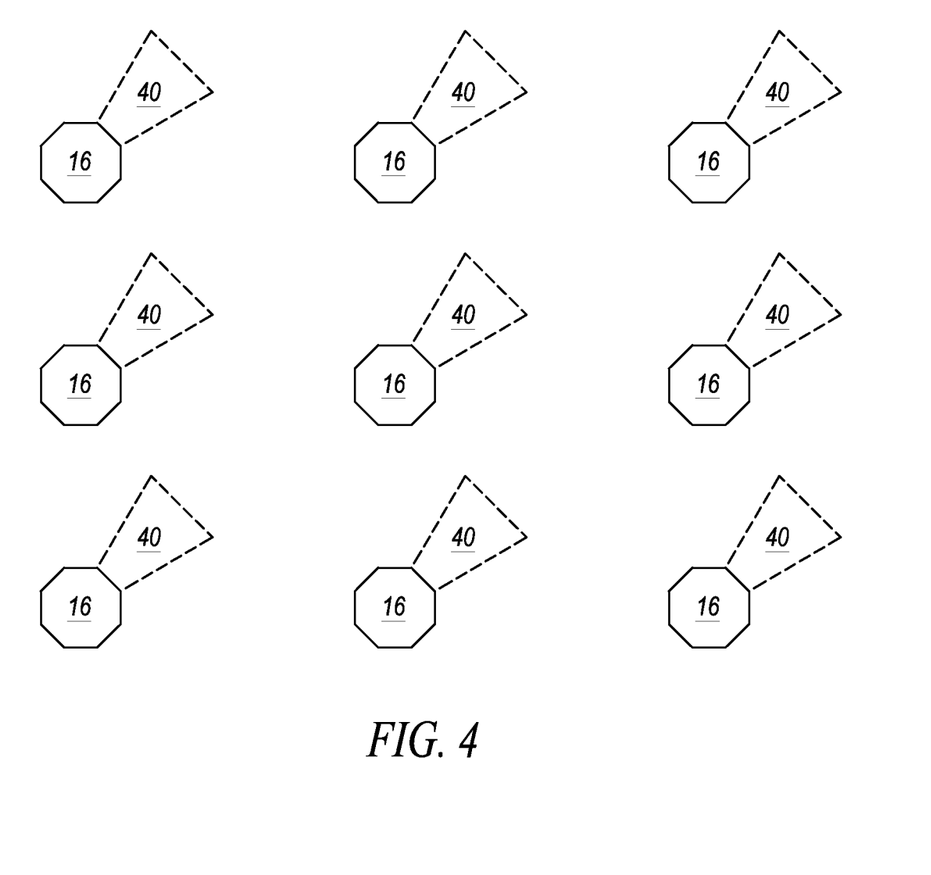
FIG. 4 is a bottom view of a ceiling with RFID readers acting in synchrony, in accordance with some embodiments of the present invention.

After synchronization, all the RFID readers 16 will sequence their antenna/frequency at the same time. If the readers share the same antenna/frequency index, then they will all use the same antenna/frequency dwell 40 at the same time, as shown in FIG. 4. If the readers do not share the same antenna/frequency index, then they will all use different antenna/frequency combinations for the dwell 40, not shown.

Figure 5:
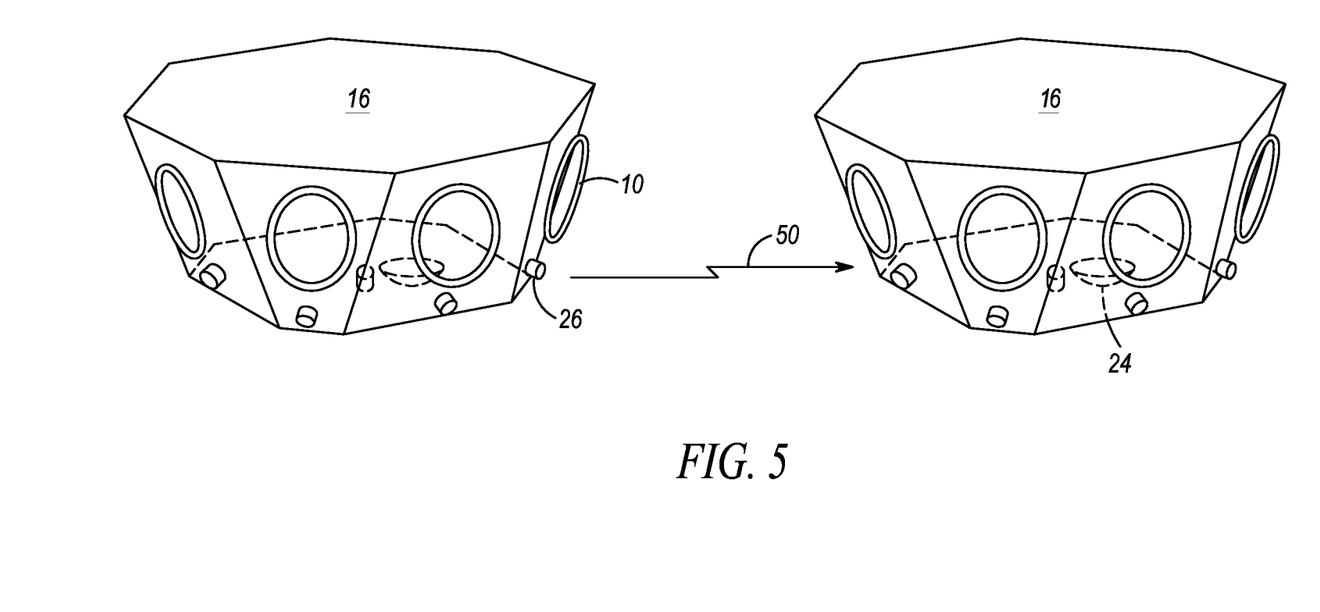
FIG. 5 is a perspective view of RFID readers being synchronized, in accordance with other embodiments of the present invention.

In an alternative embodiment, as shown in FIG. 5, each RFID reader includes a video camera 24 operable to observe the detectable (e.g. visible or infrared) LEDs 26 of associated antenna elements 10 of neighboring RFID readers, wherein the video camera serves as the light detector and any detectable LED serves as the light emitter. When any light flash 50 is observed by the video camera from any one of the detectable LEDs, this light flash 50 is treated as the master light flash, or secondary, tertiary, etc. light flash, for synchronization purposes of the RFID readers.

Figure 6:
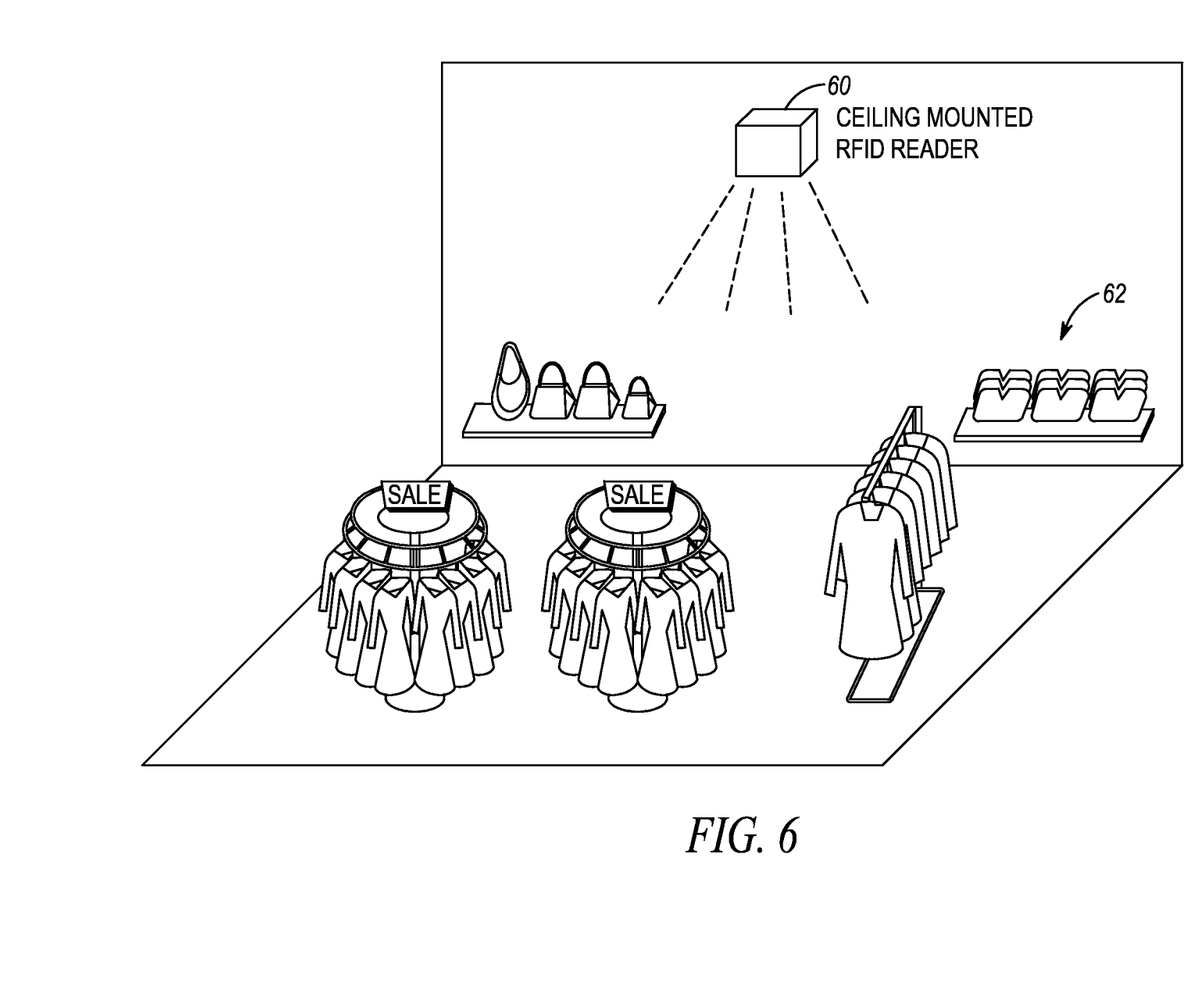
FIG. 6 is a perspective view of an example environment utilizing the RFID reader of FIGS. 1-2.

FIG. 6 is a perspective diagram of an exemplary retail environment showing one RFID reader 60 using the RFID system of the present invention in a ceiling-mounted overhead configuration (where the other RFID readers are not shown). The RFID reader 60 is configured to wirelessly interrogate a plurality of RFID tags located on or affixed to a plurality of items 62. The RFID reader 60 may be mounted to a ceiling or other overhead fixture in the retail environment. The retail environment is shown solely for illustration purposes, and the RFID antenna may be used in any environment including warehouse, manufacturing facility, file room, storage area, and the like.

The RFID reader 60 of the present invention includes a housing enclosing the wireless radios of the RFID reader disposed therein and communicatively coupled to the antenna arrangement by providing an RF feed thereto via the radio ports. The housing can also include associated electronics for providing RFID reader functionality. The housing may further include a (video) camera and an access point coupled to or integrated with the RFID reader. The RFID reader including the antenna apparatus is configured to operate in an overhead configuration with respect to a plurality of RFID tags. The multiple antenna elements are configured to provide a radiation pattern covering the floor of the environment in proximity to the reader.

In general, the RFID reader is configured to provide communication between the RFID reader and RFID tags. For example, the RFID reader "interrogates" RFID tags, and receives signals back from the tags in response to the interrogation. The reader is sometimes termed as "reader interrogator" or simply "interrogator". In an exemplary embodiment, the RFID reader may include, without limitation one or more of: a processor, a communication module, memory, a camera, and the antenna arrangement (10 of FIG. 1). The elements of the RFID reader may be interconnected together using a communication bus or another suitable interconnection arrangement that facilitates communication between the various elements of RFID reader. It should be appreciated that the above description depicts the RFID reader in an oversimplified manner and a practical embodiment can include additional components and suitably configured processing logic to support known or conventional operating features that are not described in detail herein for the sake of brevity.

The RFID reader is controlled by one or more processors to interrogate the RFID tags of the items. The housing can further include electronics and RF components for operation of the antenna arrangement. For example, the electronics and components may include electrical connectivity to the antenna feeds for transmission and reception of radio frequency signals. The housing may further include electronics and the like for operation of the RFID reader as well as other components as described herein. The housing is defined by the joined reflector panels of all the antenna elements. The electronics, components, etc. may be disposed or located behind the reflector panels within the housing.

The processor may be any microprocessor, application specific integrated circuit (ASIC), field programmable gate array (FPGA), digital signal processor (DSP), any suitable programmable logic device, discrete gate or transistor logic, discrete hardware components, or combinations thereof that has the computing power capable of managing the RFID reader 10. The processor generally provides the software, firmware, processing logic, and/or other components of the RFID reader 10 that enable functionality of the RFID reader.

The RFID reader can also include a communication module including components enabling the RFID reader to communicate on a wired or wireless network. For example, the communication module may include an Ethernet interface to communicate on a local area network. The communication module can be compliant to IEEE 802.11 and variants thereof). Additionally, the RFID reader may include other wireless technologies such as, but are not limited to: RF; IrDA (infrared); Bluetooth; ZigBee (and other variants of the IEEE 802.15 protocol); IEEE 802.11 (any variation); IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

The RFID reader can also include a memory including any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor. The memory may be utilized to store data associated with RFID interrogations, the camera, etc. The camera may include any device for capturing video, audio, photographs, etc.

Figure 7:
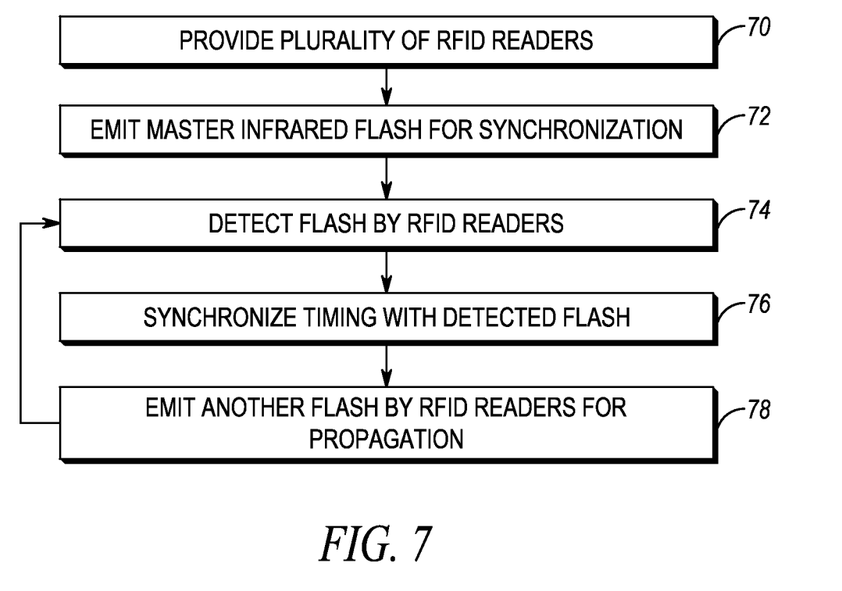
FIG. 7 shows a flowchart of a method, in accordance with some embodiments of the present invention.

Referring to FIG. 7, the present invention describes a method for synchronizing Radio Frequency Identification (RFID) readers. A first step 70 includes providing a plurality of RFID readers disposed within an environment, each RFID reader including a light emitter and a light detector. In one embodiment, the light emitter is an infrared light emitting diode and the light detector is an infrared light detector, such as an infrared-sensitive video camera, for example. In another embodiment, the light emitter is a visible or infrared detectable light emitting diode and the light detector is an existing video camera, for example. The detectable LEDs can be powered by RFID energy emitted by the associated antenna element.

A next step 72 includes emitting a master light flash from one of the RFID readers for synchronizing the remaining RFID readers. The master light flash is emitted for each interrogation dwell time, and is simply a flash of light that is unmodulated and uncoded and carries no information in itself. The master light flash can come from the dedicated light emitter or from any detectable LED that is coupled to an associated antenna element, wherein when an antenna element is active, its corresponding detectable LED is turned on.

A next step 74 includes detecting a light flash. Each RFID reader uses only the first received light flash for synchronization and ignores subsequent light flashes during a dwell period. Upon detecting a flash, the RFID reader will then synchronize 76 its dwell timing with the detected light flash, and emit 78 another light flash to other RFID readers. The dwell timing controls sequentially communicatively connecting only one antenna element at a time to the RFID reader via radio ports and using operating frequency such that only one antenna element is operable to transmit/receive at any instant in time. This can be done under the direction of an RFID reader or other processor. Specifically, each RFID reader is operable to sequence though an index of operating frequencies and different antennas, and wherein the index sequence is synchronized with the light flash received by the light detector. If all the RFID readers use the same index, then each RFID reader will use the same respective frequency and antenna at the same time after synchronization.

The method then returns to the detecting step 74 so as to propagate light flashes to all the RFID readers within the environment. This process is repeated until all tags have been interrogated or the RFID readers are directed to stop reading any tags.

Advantageously, the present invention provides synchronization at the speed of light regardless of store size, which is much faster than the interrogation dwell time, and therefore eliminates any network latency issues that would be caused by RF communications. Also, infrared light is invisible to the human eye so it will go unnoticed by customers. Further, by using infrared light there will be no Radio Frequency (WLAN, Bluetooth™, Zigbee, etc.) interference to contend with.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for synchronizing Radio Frequency Identification (RFID) readers, comprising:
 a plurality of RFID readers disposed within an environment, each RFID reader including a light emitter and a light detector, and
 a master controller including a master light emitter, the master controller operable to emit a master light flash from the master light emitter for synchronizing the plurality of RFID readers,
 wherein any of the RFID readers, upon detecting a light flash with their associated light detector, is operable to synchronize their dwell timing with the detected light flash and emit their own light flash from their associated light emitter in response to said detecting the light flash with their associated light detector, so as to propagate light flashes to all the RFID readers within the environment.

2. The system of claim 1, wherein each light flash is unmodulated and uncoded.

3. The system of claim 1, wherein the master controller is one of the plurality of RFID readers.

4. The system of claim 1, wherein each RFID reader uses only the first received light flash for synchronization and ignores subsequent light flashes during a dwell period.

5. The system of claim 1, wherein each RFID reader is operable to sequence though an index of operating frequencies, and wherein the index sequence also is synchronized by the light flash received by the light detector of the RFID reader.

6. The system of claim 1, wherein each RFID reader includes a plurality of antenna elements, wherein each RFID reader sequentially communicatively connects to only one antenna element at a time for interrogating RFID tags, and wherein the sequence for connecting antenna elements also is synchronized by the light flash received by the light detector of the RFID reader.

7. The system of claim 6, further comprising detectable light emitting diodes (LEDs) co-located with each antenna element, wherein when an antenna element is active, its corresponding detectable LED is turned on.

8. The system of claim 7, wherein the detectable LEDs are powered by RFID energy emitted by the associated antenna element.

9. The system of claim 7, wherein each RFID reader includes a video camera operable to observe the detectable LEDs of neighboring RFID readers, and wherein the video camera is the light detector and any detectable LED is the light emitter, and wherein a light flash observed by the video camera from one of the detectable LEDs is treated as the master light flash for synchronization of the RFID readers.

10. The system of claim 1, wherein the light is infrared light, the light emitter is an infrared emitter, and the light detector is an infrared detector.

11. The system of claim 10, wherein the infrared detectors are existing video cameras that are sensitive to infrared light.

12. The system of claim 1, wherein the master controller emits the master light flash for each dwell time.

13. A Radio Frequency Identification (RFID) reader among a plurality of RFID readers disposed within an environment, the reader comprising:
 a light emitter;
 a light detector, and
 a controller coupled to the light emitter and light detector, wherein upon the light detector detecting a light flash, the controller is operable to synchronize dwell timing of the reader with the detected light flash, and the controller is further operable to emit another light flash from the light emitter in response to the light detector detecting the light flash, so as to propagate light flashes to all the RFID readers within the environment.

14. A method for synchronizing Radio Frequency Identification (RFID) readers, comprising:
 providing a plurality of RFID readers disposed within an environment, each RFID reader including a light emitter and a light detector;

emitting a master light flash from one of the RFID readers for synchronizing the remaining RFID readers;
detecting a light flash, whereupon
synchronizing dwell timing with the detected light flash;
emitting another light flash in response to said detecting the light flash, and
returning to the detecting step so as to propagate light flashes to all the RFID readers within the environment.

\* \* \* \* \*